United States Patent
Grasegger et al.

(10) Patent No.: US 8,956,144 B2
(45) Date of Patent: Feb. 17, 2015

(54) DEVICE FOR PRODUCING THREE-DEMENSIONAL MODELS

(75) Inventors: Josef Grasegger, Stadtergen (DE); Andreas Dominik Hartmann, Stadtbergen (DE)

(73) Assignee: Voxeijet AG, Friedberg (DE)

( * ) Notice: Subject to any disclaimer, the term of this patent is extended or adjusted under 35 U.S.C. 154(b) by 139 days.

(21) Appl. No.: 13/576,529

(22) PCT Filed: Feb. 1, 2011

(86) PCT No.: PCT/DE2011/000092
§ 371 (c)(1),
(2), (4) Date: Aug. 1, 2012

(87) PCT Pub. No.: WO2011/095157
PCT Pub. Date: Aug. 11, 2011

(65) Prior Publication Data
US 2012/0291701 A1    Nov. 22, 2012

(30) Foreign Application Priority Data
Feb. 4, 2010  (DE) .................. 10 2010 006 939

(51) Int. Cl.
*A01J 21/00* (2006.01)
*B29C 67/00* (2006.01)

(52) U.S. Cl.
CPC .................. *B29C 67/0085* (2013.01)
USPC ........................................... 425/385

(58) Field of Classification Search
USPC .......................................... 425/385
See application file for complete search history.

(56) References Cited

U.S. PATENT DOCUMENTS

| 4,575,330 A | 3/1986 | Hull |
| 4,665,492 A | 5/1987 | Masters |
| 4,752,352 A | 6/1988 | Feygin |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |

(Continued)

FOREIGN PATENT DOCUMENTS

| AU | 720255 B2 | 5/2000 |
| DE | 4300478 | 8/1994 |

(Continued)

OTHER PUBLICATIONS

Cima et al., "Computer-derived Microstructures by 3D Printing: Bio-and Structural Materials," SFF Symposium, Austin, TX, 1994.

(Continued)

*Primary Examiner* — Joseph S Del Sole
*Assistant Examiner* — John Robitaille
(74) *Attorney, Agent, or Firm* — The Dobrusin Law Firm, P.C.

(57) ABSTRACT

The present invention relates to a device for manufacture of three-dimensional models by means of a 3D printing process, whereby the build material is deposited on a build platform in layers and the build platform is moveable in the Z-direction and one or several drive units and one or several guide elements is/are provided to move the build platform. In so doing, drive units and guiding elements are arranged in such a way that a movement of the drive units is decoupled from the movement of the guiding elements.

20 Claims, 4 Drawing Sheets

(56) References Cited

U.S. PATENT DOCUMENTS

| | | |
|---|---|---|
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,248,456 A | 9/1993 | Evans, Jr. et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,482,659 A | 1/1996 | Sauerhoefer |
| 5,490,962 A | 2/1996 | Cima et al. |
| 5,506,607 A | 4/1996 | Sanders, Jr. et al. |
| 5,555,176 A | 9/1996 | Menhennett et al. |
| 5,573,055 A | 11/1996 | Melling et al. |
| 5,582,231 A | 12/1996 | Siak et al. |
| 5,597,589 A | 1/1997 | Deckard |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Mattes et al. |
| 5,740,051 A | 4/1998 | Sanders, Jr. et al. |
| 5,753,274 A | 5/1998 | Wilkening et al. |
| 5,807,437 A | 9/1998 | Sachs et al. |
| 5,851,465 A | 12/1998 | Bredt |
| 5,902,441 A | 5/1999 | Bredt et al. |
| 5,902,537 A | 5/1999 | Almquist et al. |
| 5,943,235 A | 8/1999 | Earl et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,116,517 A | 9/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,165,406 A | 12/2000 | Jang et al. |
| 6,193,922 B1 | 2/2001 | Ederer |
| 6,217,816 B1 | 4/2001 | Tang |
| 6,259,962 B1 | 7/2001 | Gothait |
| 6,305,769 B1 | 10/2001 | Thayer et al. |
| 6,322,728 B1 | 11/2001 | Brodkin et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,467,525 B2 | 10/2002 | Herreid et al. |
| 6,476,122 B1 | 11/2002 | Leyden |
| 6,500,378 B1 | 12/2002 | Smith |
| 6,554,600 B1 | 4/2003 | Hofmann et al. |
| 6,610,429 B2 | 8/2003 | Bredt et al. |
| 6,722,872 B1 | 4/2004 | Swanson |
| 6,733,528 B2 | 5/2004 | Abe et al. |
| 6,764,636 B1 | 7/2004 | Allanic et al. |
| 6,838,035 B1 | 1/2005 | Ederer et al. |
| 7,004,222 B2 | 2/2006 | Ederer et al. |
| 7,049,363 B2 | 5/2006 | Shen |
| 7,137,431 B2 | 11/2006 | Ederer et al. |
| 7,497,977 B2 | 3/2009 | Nielsen et al. |
| 2001/0050031 A1 | 12/2001 | Bredt et al. |
| 2002/0026982 A1 | 3/2002 | Bredt et al. |
| 2002/0111707 A1 | 8/2002 | Li et al. |
| 2003/0083771 A1 | 5/2003 | Schmidt |
| 2004/0012112 A1 | 1/2004 | Davidson et al. |
| 2004/0035542 A1 | 2/2004 | Ederer et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0145088 A1 | 7/2004 | Patel et al. |
| 2005/0017394 A1 | 1/2005 | Hochsmann et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2007/0245950 A1 | 10/2007 | Teulet |
| 2008/0001331 A1 | 1/2008 | Ederer |
| 2010/0212584 A1 | 8/2010 | Ederer et al. |
| 2013/0000549 A1 | 1/2013 | Hartmann |

FOREIGN PATENT DOCUMENTS

| | | |
|---|---|---|
| DE | 4440397 | 9/1995 |
| DE | 19545167 A1 | 6/1997 |
| DE | 19853834 | 5/2000 |
| DE | 100 53 741 C1 | 2/2002 |
| DE | 69634921 T2 | 12/2005 |
| DE | 10 2007 050953 A1 | 4/2009 |
| EP | 0361847 B1 | 4/1990 |
| EP | 1415792 | 5/2004 |
| FR | 2856614 A1 | 12/2004 |
| WO | 01/96048 A1 | 12/2001 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 2004/010907 A1 | 2/2004 |
| WO | 2004-108398 A1 | 12/2004 |
| WO | 2005/082603 A1 | 9/2005 |
| WO | 2005/113219 A1 | 12/2005 |
| WO | 2007/039450 A1 | 4/2007 |
| WO | 2011/095157 A1 | 8/2011 |

OTHER PUBLICATIONS

Sachs et al., "Three-Dimensional Printing: Rapid Tooling and Prototypes Directly from a CAD Model", Massachusetts Institute of Technology, pp. 131-136, Mar. 25-28, 1990.
Sachs et al., "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?"
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gephart, Rapid Prototyping, pp. 118-119, 1996.
Marcus et al., Solid Freeform Fabrication Proceeding, Nov. 1993.
Marcus, et al., Solid Freeform Fabrication Proceedings, Sep. 1995, p. 130-33.
Related U.S. Appl. No. 12/681,957, filed Apr. 7, 2010, published as 2010/0212584.
International Search Report, Application No. PCT/DE2011/000092, dated Jul. 7, 2011, Published as WO2011/095157.
International Preliminary Report on Patentability, Application No. PCT/DE2011/000092, dated Aug. 7, 2012.
European Office Acton dated Jul. 17, 2013; Application No. 11718245.1.
US 4,937,420, 06/1990, Deckard (withdrawn)

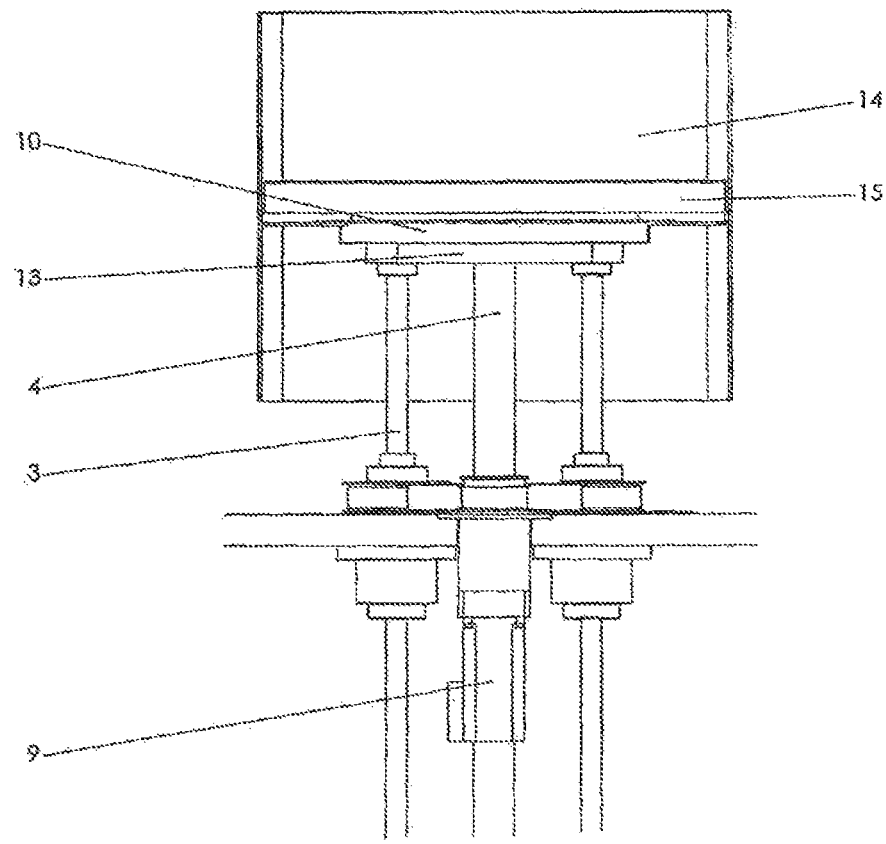
Figur 1

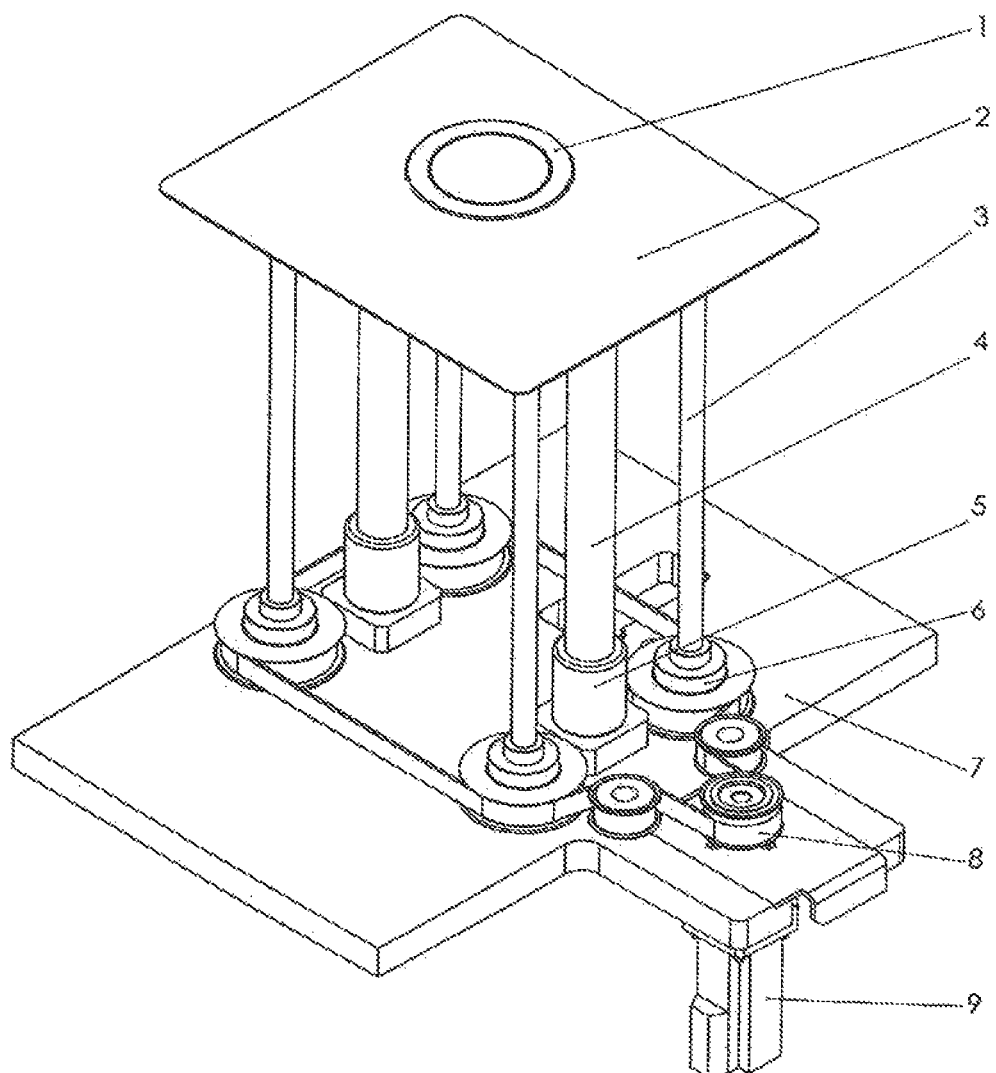
Figur 2

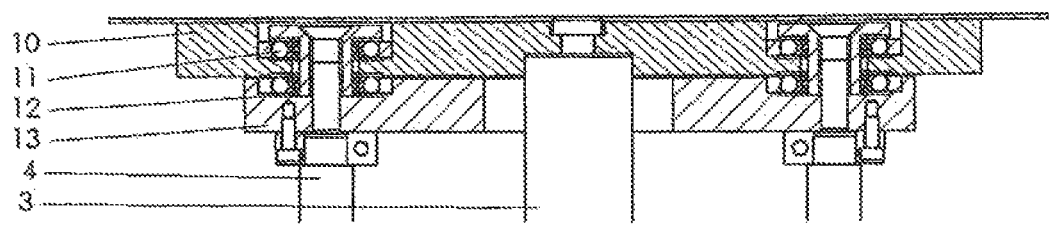
Figur 3
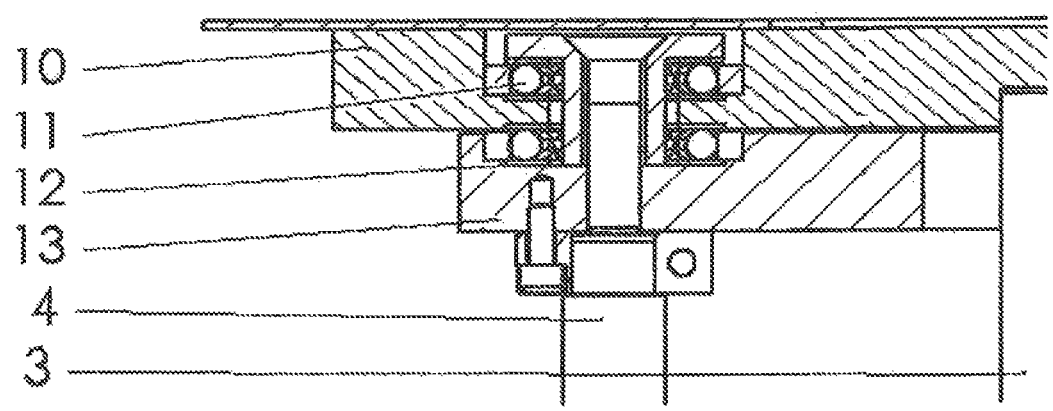
Figur 4

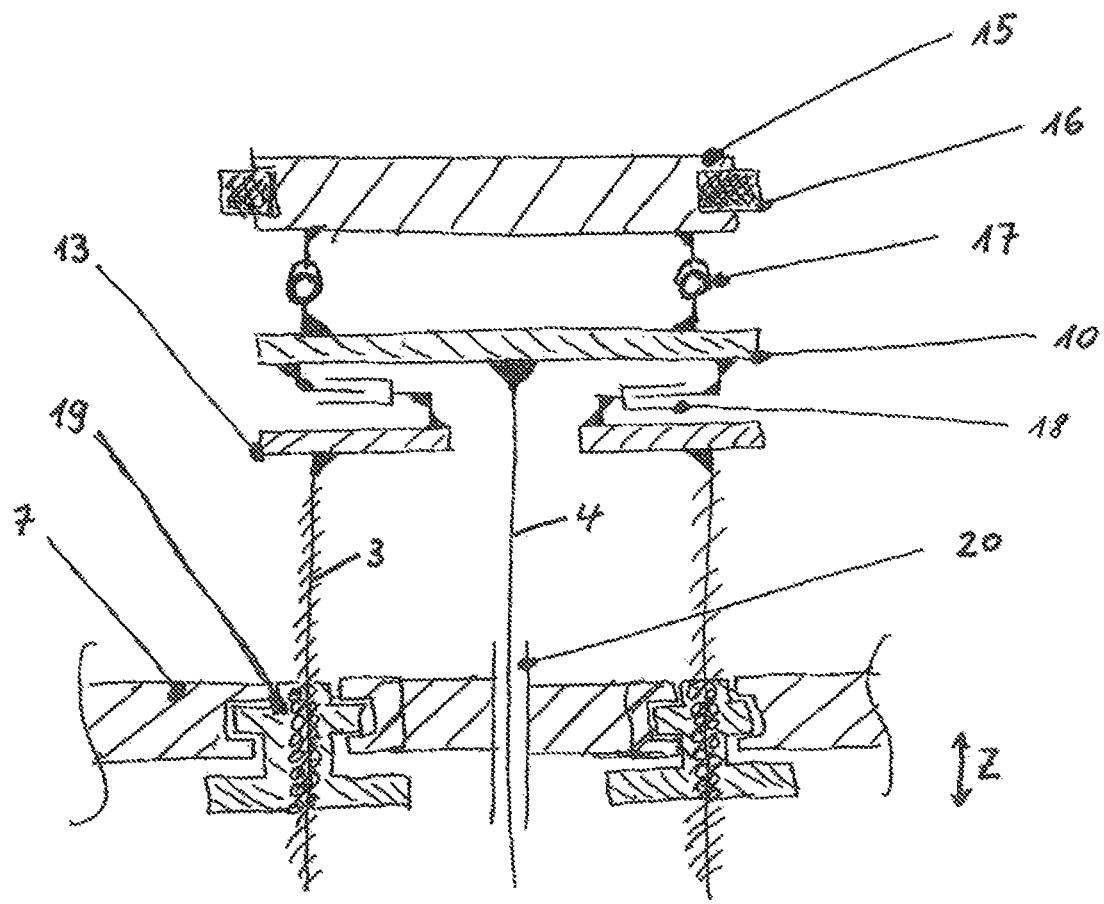
Figur 5

DEVICE FOR PRODUCING THREE-DEMENSIONAL MODELS

CLAIM OF PRIORITY

This application is claims priority from German application serial number 10 2010 006 939.6 filed 4 Feb. 2010 and from PCT Application International Application PCT/DE2011/000092, filed 1 Feb. 2011 (published as WO2011/095157), all incorporated herein by reference.

The invention relates to a device for manufacturing three-dimensional models as expressed in the generic concept of patent claim 1.

A method for producing three-dimensional objects from computer data is described in the European patent specification EP 0 431 924 B1. In this method, a particulate material is deposited in a thin layer onto a platform which, if needed, is surrounded by a chamber and then a binder material is selectively printed on the particulate material using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

The object produced from the solidified particulate material is embedded in loose particulate material as described above and such is subsequently removed therefrom. This is done, for example, using an extractor. This leaves the desired objects, from which the remaining powder is removed, e.g. by brushing.

Other powder-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

A special feature during layer-building of the three-dimensional printing process consists of the vertical movement (Z direction) of the build platform. This proceeds in very small increments, namely according to the height of the particle layer, typically in the size range between 20 μm and 500 μm.

Maintenance of the exact increment during lowering of the build platform is critical for many building solidification mechanisms, however, the binding of the particle material must be assured not only in the horizontal plane, but also in the vertical direction. If the build platform lowers in a larger increment due to defective movement of the Z-axis, this may result in the current layer not being able to properly bond with the underlying layer. This results in the so-called delamination which, in turn, results in an unusable component.

The Z-movement of the build platform also affects the accuracy of the component. The total deviation of the actual movement from the target movement by means of the build platform proceeds linearly in relation to the component tolerance and is undesirable for this reason.

In addition, every other deviation of the actual from the target movement by means of the build platform is visibly manifest as defects in the component. These deviations include, for example, wobbling movements of the build platform as well as slipping in the horizontal plane.

Acting as loads on the build platform are the forces of its own weight as well as the weight increasing during the layer-building process due to the powder feedstock and binder, respectively, the model.

In addition, acting in opposition to every movement of the build platform in the build cylinder are frictional forces between the seal and the build platform and build cylinder wall. Such a seal is necessary so that the powder cannot run through the gap between the build platform and chamber wall and thereby lead to malfunctions that could result in blockages. These frictional forces of the seals contacting the chamber wall can be very large if an error occurs, such as during a blockage of the seal.

Not least of all are also the forces and torque moments generated by the drive itself, which directly affect the build platform.

Current solutions regarding guidance and movement of the build platform include a so-called Z axis that consists of one guiding element and one drive unit. The guiding element ensures minimal deviation of the actual movement from the target movement of the build platform in respects to all three solid angles and the two horizontal directional components. The drive unit defines the exact vertical position of the platform.

A build chamber is known from the prior art, for example from WO 01/96048 A1, that possesses a movable piston connected with a spindle by means of a coupling device that, in turn, can be driven by a motor.

A similar mechanism is also known, for example, from WO 2007/039450 and U.S. Pat. No. 5,387,380.

Normally, one or more linear guiding elements with ball-bearing equipped carriages are used. Ball-screw spindle drives with servo or stepping motors have been traditionally used for this purpose. This is known from the prior art, for example from EP 1 322 438 B1, whereby therein are described yet other drive mechanisms for vertical adjustment.

The rigidity of a guiding element to counter wobbling movements of the build platform relating to the X or Y axes is determined by the length of one guide carriage or by the distance of multiple guide carriages on the guide rail. This distance must be appropriately taken into consideration in dealing with the overall length of the guiding element.

In the case of 3D printing systems, such a guiding element must not penetrate past the so-called build plane because other axes acting to move the print head are running here. The result of this is that the axis for guidance must either be placed external to the build plane or located entirely beneath this. In the first case, the torque moments that act upon the axis are increased by the additional leverage.

The torque rigidity of common guidance systems, such as recirculating ball-bearings on guide rails, is realised by means of the distance of the force deflection points in the guide rails, e.g. by the guide carriages. The result of this is that greater torque rigidity equates to a greater distance of the guide carriages. In the case of usage of a change system for job boxes, containing a build platform and an edge, the guiding element must be at least as long as the lift height of the build platform in the box plus the distance of the guide carriages.

If the guiding element is located below the build plane and if torque rigidity is greater, then the position of the build plane is displaced upward in the vertical direction. If the build plane can no longer be viewed due to the overall height of the arrangement, then this enormously restricts user-friendliness.

In another known embodiment, the guidance function is assumed by the chamber wall. In order to withstand any possible torque moments relating to the X and Y axes, multiple spindle drives that are distributed across the build platform are utilised. The disadvantage in this is that the guidance accuracy of the chamber wall is determined by the manufacturing accuracy. However, the manufacture of such chamber walls that corresponds to these requirements is time-, resource- and cost-intensive. To do so, the entire chamber wall must be mechanically machined in order to fulfil the required tolerances. Furthermore, the wall must also be sufficiently rigid to maintain such tolerances even during loads, for example, due to seal frictional forces.

According to the present invention, an object of the device relates to enabling the build platform to move in the Z axis direction with yet even greater exactitude.

This object is achieved by a device according to patent claim 1.

According to the present invention, a device for manufacturing three-dimensional models using a 3D printing process is described, whereby the build material is deposited in layers on a build platform. In order to execute the process, namely lowering of the build platform by respectively one particle layer, the build platform should be moveable in the Z-direction, and one or multiple drive units and one or multiple guiding elements are provided for said movement.

It should be reiterated that the Z direction in this context means the vertical direction relating to the build platform surface on which the component is built.

In so doing, drive units and guiding elements are arranged in such a way that a movement of the drive units is decoupled from the movement of the guiding element(s). According to the present invention, decoupled means that the undesirable movements and forces, which are incurred due to drive elements, are not transmitted to the guiding elements.

Said device now makes it possible for a 3D print method using layer building technology to execute the required lowering of the build platform in the Z direction and thereby fulfil the drive and guidance objects as per the given loads and with a high level of accuracy, even in the case of usage of build platforms of larger dimensions.

According to one preferred embodiment of the invention, at least two drive units are provided. Such a design can be advantageous in that drive motion can take place with the least amount of undesirable displacements.

Furthermore, it can be advantageous that a device according to the invention has drive units that include at least one spindle drive. Spindle drives have proven to be particularly advantageous due to their exhibiting relatively exact drive motion.

According to a further preferred embodiment of the invention, the drive elements are arranged beneath the build platform so that the vertical force can be deployed very well thereby reducing torque moments relating to the horizontal axes.

In one variant of the invention, the deployment of multiple spindles largely absorbs the torsional moments of the spindle nuts of the connected torsionally-stiff spindles via the build platform.

In order to optimally absorb the vertical forces, another preferred embodiment of the invention uses four spindles arranged at the corners of the build platform. Bessel points on the build platform diagonals are considered as optimal connection points in regards to flexing of the build platform. If an optimally stiff system is prerequisite, a combination of one individual spindle with one individual guiding element is also functionally sufficient.

It is also possible to absorb and thereby divert torsional moments by the torsionally stiff connection of multiple, but at least two, spindles via the drive plate.

In order to guarantee adequate positioning accuracy and repeatability in the vertical direction, preloaded spindle nuts are generally used. This hereby reduces axial as well as radial play. Such spindle drives tend to wobble during movement due to manufacturing and assembly tolerances. This means that the mounting point of the spindle moves relatively perpendicular to the spindle nut and transversely to the spindle axis. For example, the wobble pitch increases with the distance of the spindle nut to the spindle connection. In the case of inadequate guidance, the wobble pitch can lead to undesirable lateral movement of the build platform during the build process. Components generated by the machine and thereby affected by such defective movements manifest periodic stepping in the vertical direction.

A sufficiently stiff guidance system prevents displacement of the build platform. If wobble motion occurs, the spindle drive will elastically deform. This correspondingly leads to high forces and resulting torque moments on the guiding elements. The guiding element must be dimensioned very long in this case. However, this measure increases the construction height of the overall device, which is undesirable.

It is therefore necessary to reduce torque moments at the guiding elements. According to the invention, this occurs by decoupling the movement of the spindle drive from the movement of the build platform in the horizontal direction.

According to one preferred embodiment of the invention, the drive elements engage with the build platform via a so-called compensation platform.

If the machine is designed as a system with changeable chambers, it may make sense to switchably engage the build platform of the changeable chamber (job box floor) to a machine axis via an additional lifting platform.

For example, it is conceivable that the drive spindles are not directly supporting the build platform, but rather the compensation platform. This can move freely in the horizontal plane in contrast to the build platform. A switchable connection to the build platform is located on the lift platform above the compensation platform. The lift platform and compensation platform are connected with axial bearings in such a way that no play occurs in the vertical direction and no forces can be transmitted in the horizontal plane. The lift platform is connected with a frame via a guiding element that limits or completely eliminates horizontal displacements. The spindle nuts are mounted in a radially pivotable fashion on a base plate to which, in turn, the frame is attached. The spindle nuts are either driven individually or e.g. by means of a common belt.

In this arrangement, wobble movements of the individual spindles result in a joint movement of the compensation platform. This motion can neither be further transmitted to the lift platform nor to the build platform.

In a further embodiment, the spindles are attached in a torque-stiff but radially movable fashion to the lift platform. This type of bearing connection can be implemented by e.g. use of flexure hinges or plain friction bearings. The advantage of the previously described variants is the prevention of preloading stresses in the arrangement.

Due to the decoupling of guiding elements and drive units, the torsional moment of the spindles can no longer be transmitted to the guiding elements. In this regard it is advantageous if at least two spindles are deployed whose drive torque moments are mutually countered and supported.

For the purpose of more detailed explanation, the invention is described in further detail below on the basis of preferred embodiments with reference to the drawing.

In the drawing:

FIG. 1 A frontal view of the device according to one preferred embodiment of the invention;

FIG. 2 A spatial representation of the device according to one preferred embodiment of the invention;

FIG. 3 A cross-section view of the device according to another preferred embodiment of the invention; and FIG. 4 An enlarged view of the cross-section of FIG. 3; and FIG. 5 A cross-section view of the device according to yet another preferred embodiment of the invention;

FIG. 1 and FIG. 2 relate to the description of a preferred embodiment of the invention. In the displayed representation of the embodiment of the invention, the layer-wise building process of models takes place on the vertically positionable build platform (15).

Build platform (15) moves within a framework encompassing it on all sides. Together with the build platform (15), this framework comprises the changeable chamber (14) or job box.

The job box (14) is introduced in the 3D print machine via e.g. roller guides and secured in a defined position and locked against displacements in all directions. To construct three-dimensional models, the build platform (15) is moved in the Z axis direction (vertical machine axis). In so doing, the build platform (15) according to the displayed preferred embodiment of the invention statically engages with a lift platform (2) via a switchable clamping system (1) by means of which the clamping system (1) and the thereby connected job box floor, respectively, the build platform (15), can be moved vertically.

In the displayed embodiment, four drive spindles (3) are provided, which are connected with the lift platform (2) and vertically position this platform.

Moreover according to the displayed example, there is at least one guiding element (4) provided, which is connected to the lift platform (2) and accurately guides this lift platform (2) vertically, and respectively, absorbs horizontal forces.

In addition, the machine framework (7) bears the guide bearing (5) and a spindle drive system.

A spindle guide system according to the displayed preferred embodiment of the invention consists of four pivotable, bearing-equipped spindle nuts (6). In turn, all spindle nuts (6) are connected with a drive motor (9) via a drive belt (8).

In order to move the build platform (15), respectively move the lift platform (2) in the Z direction, the motor (9) drives all the spindles (3) at the same speed via the belt (8). In this manner, the smooth and evenly paced extension of the Z axis of the device is assured.

It can be seen in FIGS. 3 and 4 that according to the displayed preferred embodiment of the invention the lift platform (2) is subdivided into two plates, namely in a guidance plate (10) and a drive plate (13). The guidance plate (10) bears the clamping system (1) and is solidly connected with the guiding elements, which are herein displayed as guide rods (4).

The drive plate (13) bears the four drive spindles (3) in a torsionally inflexible manner. Furthermore, the drive plate (13) and the guidance plate (10) are connected to one another via a rolling-contact bearing. The rolling-contact bearing is hereby e.g. a combination of bearing disks (12) of axial needle roller bearings and a ball-bearing retainer (11) of axial groove ball bearings. This combination enables freedom of movement in the X and Y direction. In this manner, the system is positioned without any play in the Z direction.

On the underside of the platform is the drive plate (13). Through large holes, the guide rods (3) move without contact through the drive plate (13). The guide rods (3) are thereby connected with the drive plate (10).

Any distorting displacements occurring during operation are transmitted from drive spindles (3) to the drive plate (13). The movements are decoupled by bearing (11) and (12). The exact guidance of the build platform is achieved by the guidance plate (10), which horizontally connects to the housing via guide rods (3).

In FIG. 5, another design variant of the device according to the invention is shown.

A build platform (15) is arranged with slidably-mounted seals (16) running along the Z direction edge (not shown here).

According to the displayed preferred embodiment, the build platform (15) is connected to the guidance plate (10) via switchable connections (17). The guiding element (4) engages the guidance plate (10), which in turn guides the linear guiding elements (20) through the machine frame (7). Further, the guidance plate (10) is connected via compensation bearings (18) to the drive plate (13), which, in turn, engages with the drive spindles (3), which are driven by a spindle drive (19) enabling movement of the build platform (15).

DESIGNATION LIST

1 Clamping system
2 Lift platform
3 Drive spindles
4 Guiding element
5 Guide bearing
6 Spindle nut
7 Machine frame
8 Belt
9 Motor
10 Guidance plate
11 Ball-bearing retainer
12 Bearing
13 Drive plate
14 Job box/changeable chamber
15 Building platform
16 Seals
17 Switchable connection
18 Compensation bearings
19 Spindle drive
20 Linear guiding elements

The invention claimed is:

1. A device for manufacture of three-dimensional models by means of a 3D printing process comprising:
   a) a build platform so that build material is deposited on the build platform in layers and wherein the build platform is moveable in a Z-direction, and
   b) one or several drive units and one or several guide elements is/are provided to move the build platform,
   wherein the one or several drive units and one or several guide elements are arranged so that movement of the one or several drive units is/are decoupled transversely with respect to the drive direction from movement of the one or several guide elements.

2. The device according to claim 1, wherein at least two drive units are provided.

3. The device according to claim 1, wherein the one or several drive units include at least one spindle drive unit.

4. The device according to claim 1, wherein the one or several drive unit(s) is/are arranged under the build platform.

5. The device according to claim 2, wherein the one or several drive units include at least one spindle drive unit.

6. The device according to claim 5, wherein the one or several drive units are arranged under the build platform, and the guide elements move in the vertical direction.

7. The device according to claim 6, wherein the one or several drive units engage with the build platform above a compensation platform.

8. The device according to claim 7, wherein the compensation platform engages with the build platform via a lift platform, wherein the compensation platform and the lift platform are connected with axial bearings so that substantially no play occurs in the vertical direction and substantially no forces can be transmitted in the horizontal plane.

9. The device according to claim 8, wherein the lift platform engages the build platform via a switchable damping system so that the build platform can be moved along the Z-direction.

10. The device according to claim 3, wherein the at least one spindle drive unit includes a spindle nut so that axial play and radial play is reduced.

11. The device according to claim 5, wherein the at least one spindle drive unit includes a spindle nut that is driven by a belt.

12. A device for manufacture of three-dimensional models by means of a 3D printing process comprising:
   a) a build platform so that build material is deposited on the build platform in layers and wherein the build platform is moveable in a Z-direction,
   b) one or several drive units,
   c) one or several guide elements capable of moving in the vertical direction and generally free of translational movement in a horizontal direction,
   d) a first platform driven vertically by the one or several drive units, wherein the first platform is capable of moving horizontally relative to the one or several guide elements; and
   e) a second platform positioned above the first platform, vertically supported by the first platform and connected to the one or several guiding elements, wherein the first platform is capable of moving horizontally relative to the second platform;
   wherein the build platform is connected to the second platform;
   wherein the one or several drive units and one or several guide elements are arranged so that transvers movement of the one or several drive units is/are decoupled from the one or several guide elements.

13. The device of claim 12, wherein the first platform has an opening for one of the guiding elements to extend through the first platform without contacting the first platform, wherein the opening is sufficiently large for horizontal movement of the first platform relative to the guiding element.

14. The device of claim 12, wherein the build platform is attached to the second platform, the one or several drive units includes several drive spindles that control the vertical position of both the second platform and the build platform, and the one or several guiding elements control the x and y positioning of the second platform and the build platform.

15. The device of claim 14, wherein the guiding element inhibits rotations of the build platform and the second platform in the horizontal plane.

16. The device of claim 15, wherein the second platform moves vertically without any horizontal errors induced by the movement and inaccuracies of the spindles.

17. The device of claim 13, wherein the device includes several of the drive units that are driven by a common motor.

18. The device according to claim 12, wherein the first platform is a compensation platform, the one or several drive unit(s) include spindles that directly supports the compensation platform and does not directly support the build platform, the build platform is above a compensation platform, and the compensation platform an move freely in the horizontal plane in contrast to the build platform.

19. The device of claim 12, wherein the first platform is a drive plate, the second platform is a guidance plate and the drive plate is connected to a guidance plate via compensation bearings.

20. The device of claim 19, wherein the guidance plate is connected to the build platform via switchable connections and the one or several drive units include a drive spindle and the drive spindle is driven by a spindle drive.

* * * * *

UNITED STATES PATENT AND TRADEMARK OFFICE
CERTIFICATE OF CORRECTION

PATENT NO. : 8,956,144 B2
APPLICATION NO. : 13/576529
DATED : February 17, 2015
INVENTOR(S) : Josef Grasegger Page 1 of 1

It is certified that error appears in the above-identified patent and that said Letters Patent is hereby corrected as shown below:

In the Claims

Column 7, Line 14, Claim 9, "damping" should be "clamping"

Column 8, Line 30, Claim 18, "an" should be "can"

Signed and Sealed this
Twenty-sixth Day of May, 2015

Michelle K. Lee
*Director of the United States Patent and Trademark Office*